US006793998B1

(12) United States Patent
Silvestre

(10) Patent No.: US 6,793,998 B1
(45) Date of Patent: Sep. 21, 2004

(54) MASKING METHOD AND MASKING MEANS

(76) Inventor: Jean Silvestre, rue de Liège, 4171 Hamoir (BE)

( * ) Notice: Subject to any disclaimer, the term of this patent is extended or adjusted under 35 U.S.C. 154(b) by 0 days.

(21) Appl. No.: 08/485,277

(22) Filed: Jun. 7, 1995

Related U.S. Application Data

(63) Continuation of application No. 08/122,664, filed on Sep. 17, 1993, now abandoned, which is a division of application No. 07/964,464, filed on Oct. 21, 1992, now Pat. No. 5,260,097, which is a continuation of application No. 07/700,888, filed on May 10, 1991, now abandoned, which is a continuation of application No. 07/411,377, filed on Sep. 22, 1989, now abandoned.

(30) Foreign Application Priority Data

Sep. 22, 1988 (BE) .......................................... 08801085

(51) Int. Cl.[7] ................................................ B32B 3/26

(52) U.S. Cl. .................................. 428/40.1; 428/317.3

(58) Field of Search .............................. 428/40.1, 36.5, 428/317.3, 317.7, 343, 344, 409, 423.1; 118/505

(56) References Cited

U.S. PATENT DOCUMENTS

| | | | | |
|---|---|---|---|---|
| 1,726,744 A | | 9/1929 | Krug | |
| 1,960,137 A | * | 5/1934 | Brown | 428/40 |
| 2,054,448 A | | 9/1936 | Russell | 154/2 |
| 2,171,544 A | | 9/1939 | Doty et al. | 91/68 |
| 2,210,233 A | | 8/1940 | De Lillo | 91/65 |
| 2,755,196 A | | 7/1956 | Scholl | 117/4 |
| 2,793,676 A | | 5/1957 | Hubmeier | 154/30 |
| 2,874,084 A | | 2/1959 | Paulsen | 154/53.6 |
| 2,959,152 A | | 11/1960 | Byers et al. | 118/505 |
| 3,032,433 A | | 5/1962 | Lewis et al. | 117/38 |
| 3,117,902 A | | 1/1964 | Holzheimer | |
| 3,123,656 A | | 3/1964 | Rochlin | 264/321 |
| 3,271,232 A | | 9/1966 | Moore | 161/175 |
| 3,320,108 A | | 5/1967 | Lande | 156/219 |

(List continued on next page.)

FOREIGN PATENT DOCUMENTS

| | | | | |
|---|---|---|---|---|
| DE | 2362584 | | 6/1975 | |
| DE | 2611631 | | 10/1977 | |
| DE | 68607368 | | 3/1986 | |
| EP | 0207720 | | 1/1987 | |
| EP | 0248652 | | 12/1987 | |
| EP | 0249444 | | 12/1987 | |
| EP | 0256782 | | 2/1988 | |
| EP | 0257872 | | 3/1988 | |
| EP | 0262946 | | 4/1988 | |
| EP | 0263637 | | 4/1988 | |
| EP | 0303270 | | 2/1989 | |
| EP | 0305219 | | 3/1989 | |
| FR | 2042417 | | 7/1976 | |
| FR | 2588875 | | 5/1988 | |
| GB | 825867 | * | 12/1959 | 428/317.3 |
| GB | 849774 | | 1/1961 | |
| GB | 885660 | | 12/1961 | |
| JP | U-59-158470 | | 10/1984 | |
| WO | 9015668 | | 12/1990 | |

OTHER PUBLICATIONS

Tesa Katalog: Industrieklebebaender und Verarbeitungsgeraete Aug. 1973.

*Primary Examiner*—Nasser Ahmad
(74) *Attorney, Agent, or Firm*—Jacobson Holman PLLC

(57) ABSTRACT

A method and means for masking at least a part of a surface to be treated wherein an element that is resistant to surface treatment operations is removably applied to said part of said surface and is removed after finishing said treatment. As element a compressible cushion is applied on at least a portion of an irregularity in said surface wherein said cushion is adaptable to the irregularity on which it is applied.

13 Claims, 3 Drawing Sheets

U.S. PATENT DOCUMENTS 3,380,435 A 4/1968 Wagner ...................... 118/505
3,519,708 A 7/1970 McMichael ................. 264/321
3,536,569 A 10/1970 Gosnell
3,556,924 A * 1/1971 Loew ...................... 428/317.7
3,629,034 A 12/1971 Kuroda
3,634,565 A 1/1972 Schaerer ...................... 264/54
3,666,587 A 5/1972 Nagao ........................ 156/199
3,724,420 A 4/1973 Quinn
3,758,992 A 9/1973 Olson
3,844,876 A 10/1974 Wilson et al. .............. 161/119
3,869,831 A 3/1975 Gibb ............................. 51/75
3,881,980 A 5/1975 Olson ......................... 156/268
3,884,132 A 5/1975 Snodgrass
3,930,069 A 12/1975 Stephens
4,064,654 A 12/1977 Olson .......................... 49/489
4,201,799 A 5/1980 Stephens .................... 427/142
4,313,970 A 2/1982 Jones et al.
4,341,828 A 7/1982 Stephens ..................... 428/40
4,393,116 A 7/1983 Taylor ........................ 428/343
4,410,383 A 10/1983 Lipari ....................... 156/73.1
4,420,520 A 12/1983 Jones et al. ................... 428/42
4,430,137 A 2/1984 Jones ......................... 156/247
4,507,330 A 3/1985 Schaaf
4,591,137 A 5/1986 Steinberg
4,714,633 A 12/1987 Horiki et al.
4,740,256 A 4/1988 Vosberg
4,755,408 A 7/1988 Noel ........................... 428/36
4,759,959 A 7/1988 Guy
4,764,421 A 8/1988 Horiki et al.
4,789,579 A 12/1988 Tutas et al. ................. 428/118
4,806,404 A * 2/1989 Cascino ....................... 428/40
4,833,016 A 5/1989 Segawa et al. .......... 428/317.1
4,868,045 A 9/1989 Horiki et al.
4,996,092 A 2/1991 Francis et al. .............. 428/157
5,128,176 A 7/1992 Schmidt

* cited by examiner

MASKING METHOD AND MASKING MEANS

This is a continuation of application Ser. No. 08/122,664, filed Sep. 17, 1993 now abandoned, which is a divisional of Ser. No. 07/964,464, filed Oct. 21, 1992 (U.S. Pat. No. 5,260,097), which is a continuation of Ser. No. 07/700,888, filed May 10, 1991, now abandoned which is a continuation of Ser. No. 07/411,377, filed Sep. 22, 1989 now abandoned.

The invention relates to a method for masking at least a part of a surface to be treated wherein an element that is resistant to surface treatment operations is removably applied to said part of said surface and is removed after finishing said treatment. The invention also relates to a masking means, wherein said masking means is formed by a removable element which is resistant to surface treatments.

BACKGROUND OF THE INVENTION

Such a masking method and masking means is known from the use of a masking tape, or from the use of a grooved panel of plastic foam as described in the European patent application No. 0207720. These known methods are for example applied in priming and painting of vehicle coachwork, in particular automobile coachwork, or in refinishing work, sandblasting or other surface treatments. In order to prevent paint or other substances to be applied on a surface to be treated from penetrating or covering at least a part of the surface to be treated, that part is masked by using an element that is resistant to surface treatment operations. The element is resistant to surface treatments operations and masks the surface during the treatment and is removed following the treatment.

A drawback of the grooved plastic foam panel is that, due to its panel shape, it is primarily appropriate for masking a planar surface. In particular for surface treatment operation on the body of a vehicle it is not enough to mask only the planar surfaces, since the vehicle body shows a lot of irregularities. Those irregularities usually masked with protection paper and/or masking tape which is a time-consuming operation, because it has to be performed very carefully. Also these known masking methods do not always result in a satisfactory surface treatment. The dust left in the openings can cause contamination of the treated surface. Turbulences can occur around those openings or edges causing an uneven application of the substance to be applied on the surface to be treated.

An object of the invention is to mitigate the above mentioned drawbacks.

According to the present invention a compressible cushion is applied as said element on at least a portion of an irregularity in said surface wherein said cushion is adaptable to said portion of said irregularity on which it is applied.

Due to the fact that the masking element is formed by a compressible cushion, it is no longer necessary to use protection paper nor to apply several masking tape layers in order to mask an irregularity, thus providing a substantial time saving. The compressible cushion adapts itself for filling or covering surface irregularities such as openings or edges. Thus the cushion prevents the formation of turbulences and so the contamination by dust originating from the openings, and enables an adequate masking of the irregularities.

The gist of the present invention is to use an adaptable compressible cushion as masking element in order to mask irregularities. Due to the fact that the cushion is adaptable to the irregularity it takes the exact shape of the irregularity thus providing an excellent masking.

A masking means according to the invention is characterized in that said element is a compressible cushion which is adaptable to the irregularity to which it is applied.

Masking means having the shape of a particular irregularity are known and are for example described in the European patent application No. 0263637. However the difference between a masking means according to the present invention and the masking means according to the latter patent application is that the masking means according to EPA 0269 637 have a particular preformed shape which is on beforehand completely adapted to the irregularity and can thus only be used for masking an irregularity of that particular shape. The masking means according to the present invention is not on beforehand adapted to a particular irregularity but adapts itself to the irregularity to which it is applied. The masking means according to the present invention is thus universally applicable to many kinds of irregularities while the masking means according to EPA 2263637 is not universally applicable.

One should not confuse a masking gasket with a conventional sealing gasket. Indeed, in automobiles it is well known to apply a sealing gasket on the innerlip of a door, hood or a trunk, in the frame of the door or in the other openings which prevents inter alia water and noise from penetrating inside the vehicle. Those sealing gaskets are applied by the manufacturer of the car at a well-defined place and are generally manufactured for each particular automobile model. Those sealing gaskets are quasi-permanently fixed in place. On the other hand, a masking gasket according to the invention only serves for masking, as its name indicates, and not for permanent sealing purposes.

The use of a thermoplastic foam for masking purposes is described in the U.S. Pat. No. 4,714,633. That patent describes the use of an expending and shrinking thermoplastic foam member that contains a cavity. During the surface treatment operation or when the member is heated afterwards, the member according to the U.S. patent will change its form in order to be separated in a natural way of the article on which it has been fixed. On the other hand, the masking means of the invention resists surface treatment operation, i.e. its original configuration will not modify under influence of the surface treatment, unlike the member described in the patent. Contrary to the masking means according to that patent, the masking means according to the invention need not include a cavity which enables a separation operation. The member according to the cited U.S. patent is clearly used in surface treatment operations where its extending and shrinking properties are essential, while the masking means according to the invention is applied in surface treatment operations where its resistance to the treatment plays an important role.

The invention thus provides a non-evident application of a masking means. Indeed, the idea of using a cushion is not evident with respect to the well known use of masking tapes. Several solutions such as pre-treatment of surfaces (see for example the Japanese patent applications 85021787 or 81211929 have already been tested out in order to reduce secondary effects due to the masking during surface treatment operations. The use of a masking means according to the present invention not only enables a substantial time saving but also a quality improvement without use of pre-treatment operations or the like.

SUMMARY OF THE INVENTION

A first preferred embodiment of a masking means according to the invention is characterized in that said cushion is an elongated cushion. The elongated cushion offers the advantage that it can be applied in one piece over the whole length of the irregularity to be masked, thus avoiding connection parts which coul cause turbulences having a negative influence on the achievement quality.

Preferably that said cushion has substantially the same cross section over its whole length. This enables a uniform masking.

A first preferred embodiment of a masking method according to the invention is characterized in that said cushion is applied to an elongated irregularity. Elongated irregularities are usual in vehicles. The cushion according to the invention enables an excellent masking of such irregularities in vehicles.

In a second preferred embodiment of a method according to the invention said cushion is positionably adhered on said part of said irregularity. This enables accurate positioning of the cushion when it has incorrectly been applied.

The invention also relates to a device for applying the masking means according to the invention. The device according to the invention is characterized in that it comprises a drum for unwinding said cushion.

In another preferred embodiment a method according to the invention is characterized in that said cushion is formed by applying to said part of said irregularity a polymerizing foam comprising at least a reactive substance. That method is for example applied for masking parts which are difficult to access and thus provides an easy application of the foam on the irregularity to be masked.

A second preferred embodiment of a masking means according to the invention is characterized in that said masking means comprise an elastic foam cushion which is provided with a pressure sensitive adhesive layer, which covers at least a part of said cushion. The cushion can thus easily be applied on the irregularity by simply adhering the cushion thereon.

Preferably said cushion is hollow. this enables saving of material and also gives more flexibility to the cushion.

Preferably said cushion is wound in a coil. This offers an adequate packing for the masking means.

BRIEF DESCRIPTION OF THE DRAWINGS

The invention will now be described more in details by means of examples illustrated in the drawing in which.

DETAILED DESCRIPTION

Figure 1:
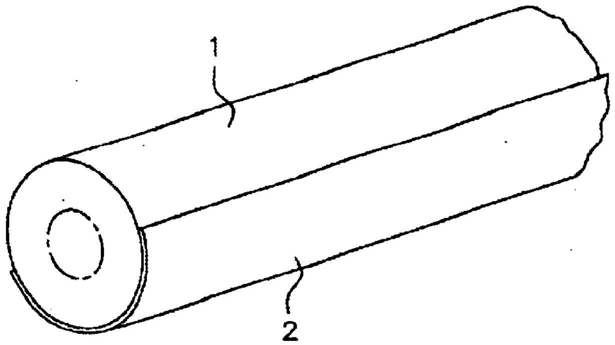
FIG. 1 illustrates a first preferred embodiment of a masking means according to the invention.

On the different figures corresponding elements are referred to with the same reference numerals. It will be veident that the invention is not limited to the described embodiments and that within the scope of the invention different embodiments are possible.

In the example shown in FIG. 1, the masking means according to the invention is formed by a cushion 1 which is cylindrically shaped and elongated. The cushion is a compressible cushion preferably made out of an absorbing material. The cushion 1 is at least partially provided with a pressure sensitive adhesive layer formed by an self adhesive film. that adhesive layer enables the fixing of the cushion and also the easy removing thereof after the surface treatment has been accomplished.

Preferably the cushion 1 is an elastic foam cushion which is made of a material resistant to surface treatment operations. The foam thus for example resists high temperatures of a spraying cabin for automobiles, to solvents and humidity. The material used for manufacturing the cushion is preferably a synthetic material such as for example polypropylene, neoprene, polyester, polyurethane or acrylic. It will be evident that other materials, elastic or not, synthetic or natural, which resist surface treatment operations can also be used. The adhesive layer 2 is for example formed by an adhesive based on rubber, resin, acrylic, or other suitable material, having an immediate tack. If necessary, the cushion could be provided with a repositionable adhesive layer, which should be resistant to solvents and changes in temperature.

Figure 2:
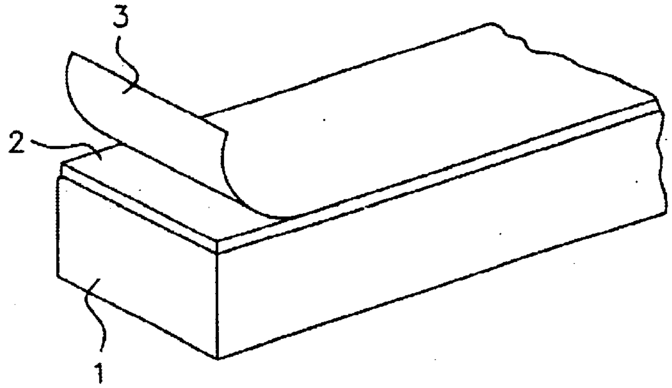
FIG. 2 illustrates a second preferred embodiment of a masking means according to the invention.

The cushion can have different cross-sections, for example it can have a diameter within a range of 5 to 50 mm, and is preferably presented rolled up. The cushion can also have a rectangular cross-section, such as shown in FIG. 2 or a cross-section of any other geomatrical form, such as for example triangular or trapezoidal. Preferably the cushion has substantially the same cross-section over it whole length.

This cushion can be either solid or hollow, such as for example illustrated in dotted line in FIG. 1. A hollow cushion improves the elasticity of the masking means while saving material.

The adhesive layer 2 can be covered by a liner 3, which is removed before the masking means is applied. The adhesive layer can also be applied to the whole or to a substantial portion of the exposed portion of the cushion, for example when a rectangular cushion is used such as illustrated in FIG. 2, the adhesive layer can be applied to two or more sides of the cushion thus enabling a better and/or easier application of the cushion.

The adhesive substance is preferably self-sticking, thus forming with the foam a self-sticking assemblage realized either by a pressure sensitive adhesive film which at least partially covers the cushion, such as illustrated in FIGS. 1 and 2, or by manufacturing a cushion from a foam which itself is tacky. In the latter case, the foam can be completely covered by a protection liner. A foam which is provided with a pressure sensitive adhesive is particularly advantageous for appliations on vehicle body reparing. Indeed, the surface to be masked can sometimes impose multiple contorsions upon the cushion. When the foam is provided with an adhesive layer, one can reliably obtain a satisfying adhesion, notwithstanding the geometric form of the irregularity to be masked.

However the cushion 1 can also be fixed on the irregularity which has to be masked by other means, which are not necessarily self-sticking. For example it is possible to use a cushion which is not self-sticking and to first spray an adhesive on the surface on which the cushion has to be applied, and thereafter stick the cushion on the applied adhesive.

In another embodiment of the masking method, the elastic foam cushion is formed by applying on the surface, which has to be masked, a polymerising foam made from a suitable reactive substance or substances. That reactive substance is for example stored in an aerosol container and is prayed on the surface to be masked. This enables a masking of places which are otherwise difficult to access for applying thereon a masking cushion.

Figure 4:
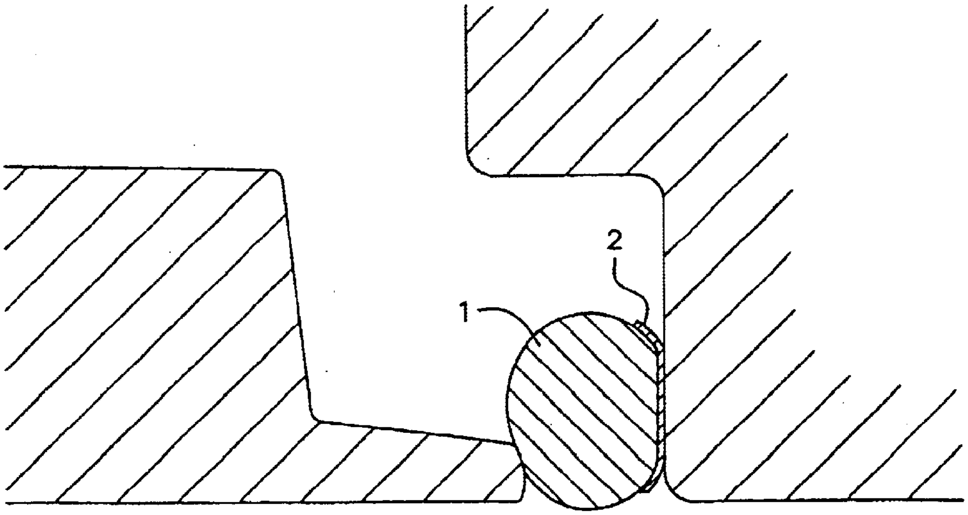
FIG. 4 illustrates a cross-section of a masking means according to the invention applied on an automobile.
Figure 3:
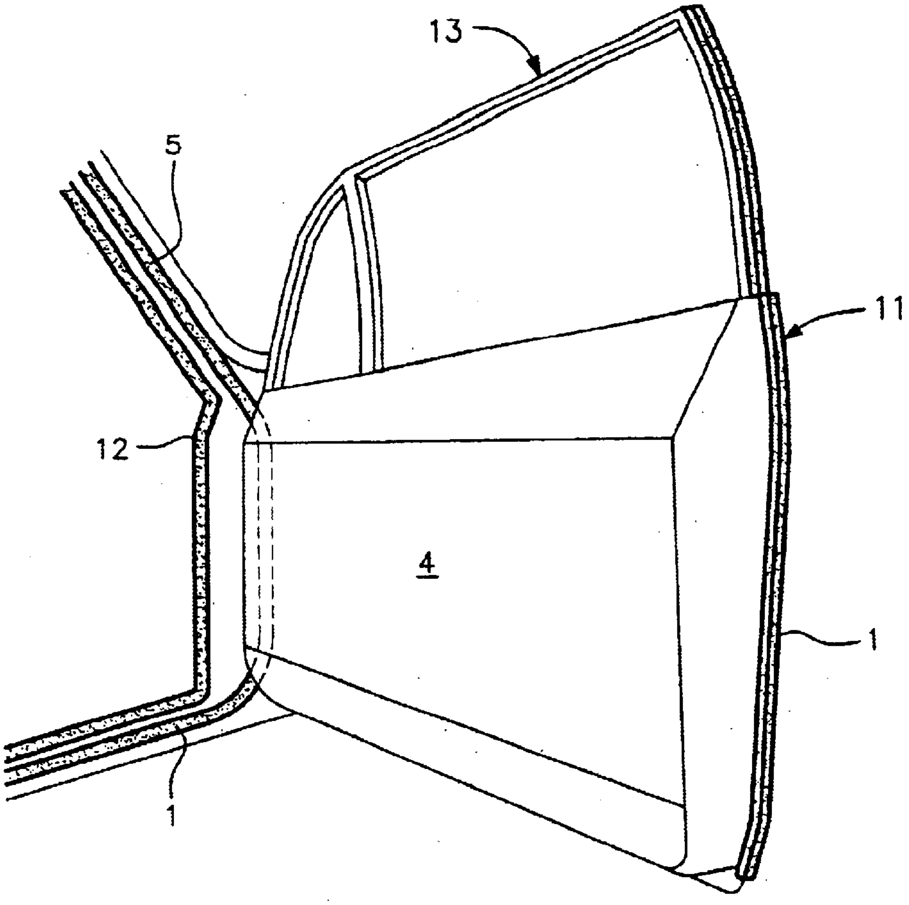
FIG. 3 illustrates the result of a method according to the invention when applied on the open door of an automobile.

The FIGS. 3 and 4 illustrate the masking according to the invention as applied to the door of an automobile. Suppose that the external surface 11 of a door 4 has to be painted by spraying. In order to prevent paint from penetrating into a crevice or opening between the door and the surrounding parts of the coachwork and adhering to the sealing gasket, or weatherstrip 12, it is necessary to mask the opening. therefore the cushion 1 according to the invention is applied for example by means of its adhesive layer, on the border of the lip of the door 4, of the side 5 of the door, and on all the other portions which represent an irregularity with respect to the surface of the door such as the border lines of the windows, bottom of the car body, the latches of the doors and other surrounding surfaces, that do not need to be treated. By closing the door, a pressure will be applied to the cushion. due to the fact that the cushion is compressible, it will be lightly compressed thereby adapting itself to the portion or the whole irregularity on which it is applied and sealing the opening or at least partially filling or bridging the surface irregularity. When the paint is applied to the door, the cushion will, on the one hand, prevent the paint from penetrating in the opening by absorbing that paint and, on the other hand, due to the fact that the cushion obstructs the opening or fills at least partially the irregularity, the effects due to turbulences in and around the openings are practically eliminated and will not affect the achievement of a satisfactory surface treatment. Also due to the fact that the openings are obstructed, residues of dust, humidity and others, which remain in the openings will remain enclosed therein and will no longer be affected by the pressure of compressed air and will thus no longer affect the achievement of a satisfactory surface treatment.

When the surface treatment operation is finished, the cushion is removed from the parts on which it has been applied. the substances used for the surface treatment can not reach and thus will not affect the protected surface irregularities. This is particularly the case when using an absorbing material for the cushion and which also absorbs any liquid substances used for the surface treatment. Due to the absorption capacity of the cushion, traces along the border forming the transition between the cushion which has hust been removed and the treated surface can no longer be seen. Indeed, the substance used for the surface treatment and which is applied either on the cushion or on the border between the cushion and the treated surface is now been absorbed by the cushion.

The cushion can also be applied on portions of the surface which are not damaged, or which are made from a different material as the one used for the door to be treated, such as for example the brightwork surrounding the windows.

The method according to the invention is very appropriate for application on modern vehicles having a low Cx value (in the order of 0.30; Cx=air penetration coefficient). Indeed for aerodynamical reasons some sealing gaskets are applied very close to the openings. Due to its compressibility and elasticity the cushion according to the invention allows simultaneously masking of the sealing gaskets and the opening which remains between the sealing gaskets and the coachwork.

As shown in the FIGS. 1 and 2 the cushion is an elongated cushion. Such an elongated cushion is particularly suitable to be applied on an elongated irregularity such as for example a crevise between a door, a hood or a hatch and the vehicle body. Since the cushion is elongated it can be applied practically in one piece over the whole length of the elongated irregularity, thus avoiding openings between cushion parts which could cause turbulances during the surface treatment or penetration of paint and the like between those cushionparts. Further due to the fact that the cushion is compressible and elastic it can easily be bent in all kind of corners shown by the irregularity to be masked, which offers a continuous masking. Also due to the fact that the cushion is made of elastic foam its thickness can easily be zdapted to the depth of the irregularity by simply stretching or compressing in length the elongated cushion.

Another advantage of the cushion according to the invention is that it is repositionable which offers the possibility to reposition the cushion when it has incorrectly be applied on the irregularity to be masked.

The cushion can be directly fixed to the metal body of the car or be superposed on the sealing gasket. Indeed, the adhesive characteristics of the masking gasket according to the invention allows the cushion to be applied as well on metal, rubber, as to any other materials, such as for example plastics. It is also possible to remove first the sealing gasket of the vehicle and then to masks the opening thus formed using a cushion according to the invention.

Due to the easy application and the technical characteristics of the cushion a substantial time saving of nearly two thirds of the time required for the conventional masking of a vehicle door opening using the masking tape method can be gained and thus a substantial economy realized.

Figure 5:
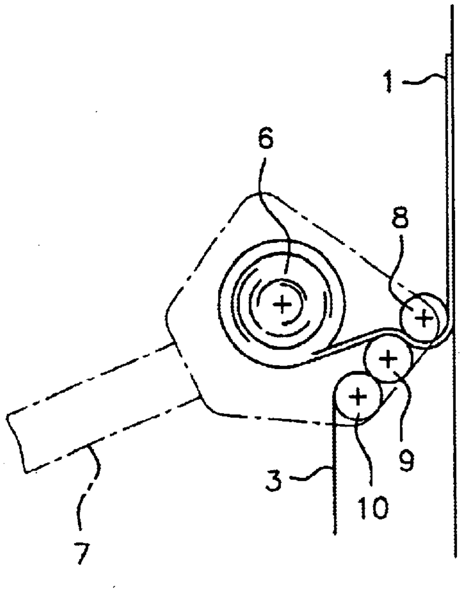
FIG. 5 illustrates an example of a device for applying a masking means according to the invention.

The masking means according to the invention can be applied either by hand or by means of a device such as shown in FIG. 5. The device comprises a drum or core on which the cushion is wrapped. The device is provided with an handle 7 and with three rollers 8, 9 and 10. The cushion 1 passes between the rollers 8 and 9. By pressing the, roller 8 against the surface to be masked, the rolling of the latter will engage the roller 9 which on its turn will cause the cushion to unwind from the drum 6. When the cushion comprises a protective liner covering the adhesive substance, that protective liner 3 passes between the rollers 9 and 10. The engagement of the rollers 9 and 10 will cause the detachement and the removal of the protection liner when the cushion is applied on the surface to be masked.

The device can also be provided with a further roller on which the protective liner is rolled after it has been remoed from the cushuin. The device enables an easy and quick application of the cushion on the surface to be masked.

Figure 6:
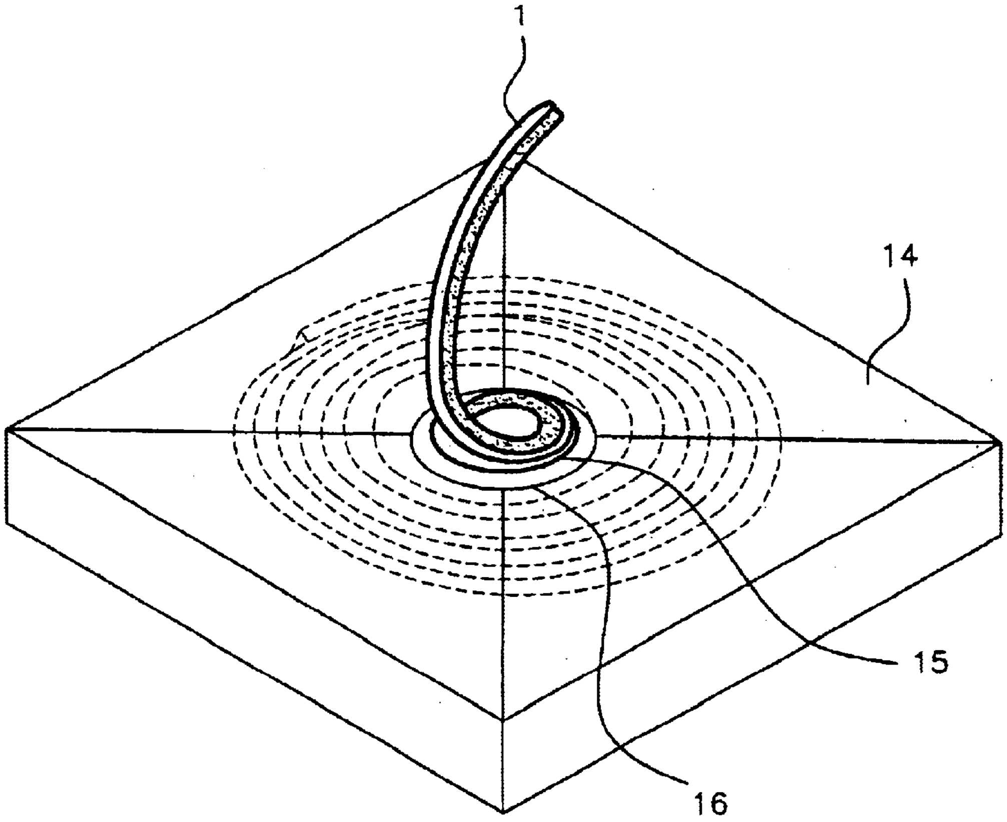
FIG. 6 illustrates a masking means according to the invention which masking means is wound on a coil and packed in a box.

FIG. 6 illustrates a packing box 14 comprising a masking means according to the invention. The packing box 14 is provided with a central opening 16 through which the cushion is pulled out. The cushion is wound on a coil 15 in the same fashion as electrical wire often is marketed. This way of packing offers the advantage that the cushion is suitably protected when it is inside the box, that it remains coiled and that it can easily be pulled out of the box which during the application of the masking means can simply rest on the floor.

It is also possible to fix the device on a robot arm in which the trajectory along which the cushion has to ba applied on the irregularity to be masked is loaded into the arm's memory.

It will be clear that the invention is not only applicable on automobiles but can also be applied on all kind of surface treatment operations such as for example the painting of the frame of a window of a home or cleaning at high pressure.

What is claimed is:

1. A mask for surface treatment comprising a cylindrically shaped, elongated, compressible and bendable cushion of surface-treatment resistant material having an adhesive layer.

2. The mask of claim 1 wherein the cushion is liquid-absorbent.

3. The mask of claim 1 wherein the cushion is capable of being removably applied to a surface by means of the adhesive.

4. The mask of claim 1 wherein the cushion is capable of adapting to an irregularity in the surface.

5. The mask of claim 1 wherein the cushion is capable of filling an opening between adjacent surfaces so as to prevent treatment material from passing through the opening.

6. The mask of claim 1 wherein the cushion is capable of being applied to the space between a door, hood, or hatch and a vehicle body adjacent the door, window, or hatch.

7. A mask for surface treatment comprising a rectangularly shaped, elongated, compressible and bendable cushion of surface-treatment resistant and liquid-absorbent material having an adhesive layer.

8. The mask of claim 7 wherein the cushion is capable of being removably applied to a surface by means of the adhesive.

9. The mask of claim 7 wherein the cushion is capable of adapting to an irregularity in the surface.

10. The mask of claim 7 wherein the cushion is capable of filling an opening between adjacent surfaces so as to prevent treatment material from passing through the opening.

11. The mask of claim 7 wherein the cushion is capable of being applied to the space between a door, hood, or hatch and a vehicle body adjacent the door, window, or hatch.

12. A mask useful during spray painting operations on an automobile surface, said mask comprising an elastic foam cushion having a thickness that is distorted by either compressing or stretching said cushion lengthwise (to adapt said thickness) to mask spaces of different thickness on said automobile surface, said cushion having a configuration that will not be changed by exposure to said spray painting operations, wherein said cushion is liquid-absorbent, and wherein said cushion has a layer of adhesive thereon.

13. A mask provided for spray painting operations on an automobile coachwork, said mask being formed by a foam cushion that is bendable so as to be applied along the periphery of a part of said coachwork and fit along said periphery, said cushion having a configuration that remains unchanged when spray painting and thermal treatment are applied on said part, wherein said cushion is paint-absorbent and has a layer of adhesive applied thereon.

* * * * *